Aug. 27, 1929.   T. R. TARN   1,726,249
COMPENSATING CRANK STRUCTURE FOR PITMAN DRIVES
Filed May 31, 1923   3 Sheets-Sheet 1
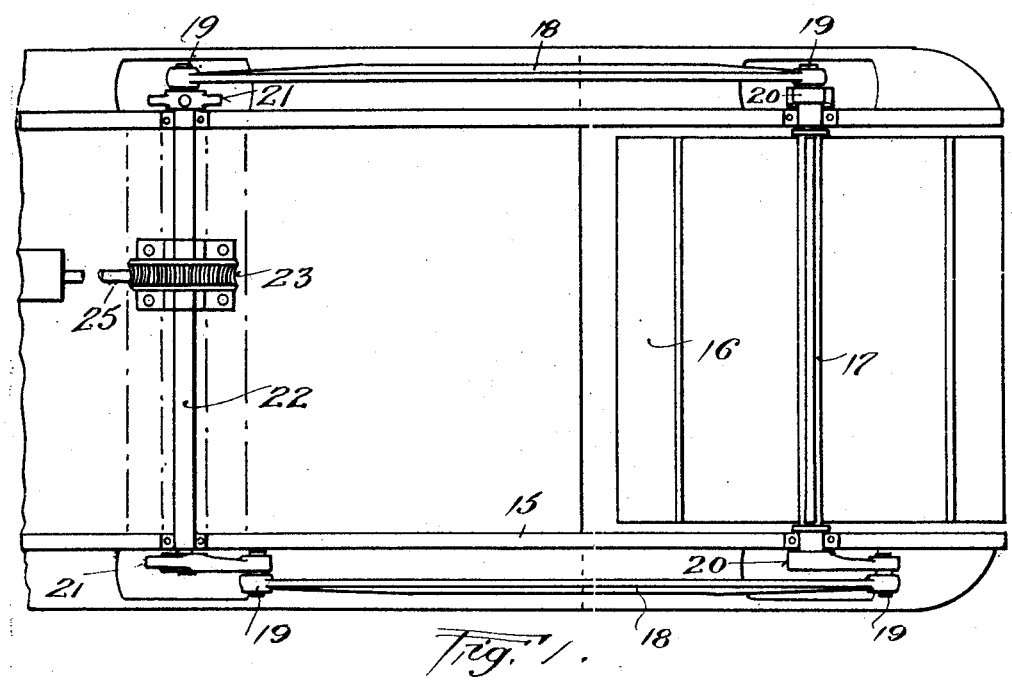
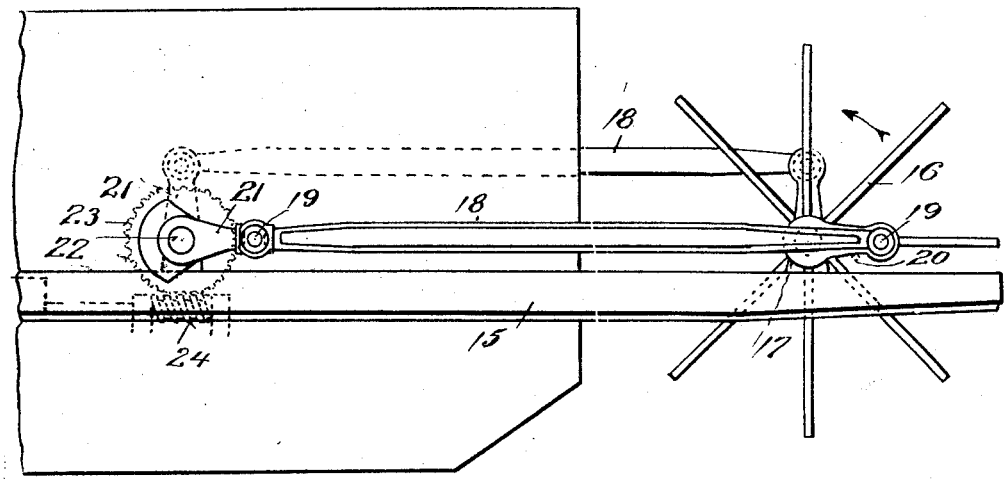

Aug. 27, 1929.   T. R. TARN   1,726,249
COMPENSATING CRANK STRUCTURE FOR PITMAN DRIVES
Filed May 31, 1923   3 Sheets-Sheet 2
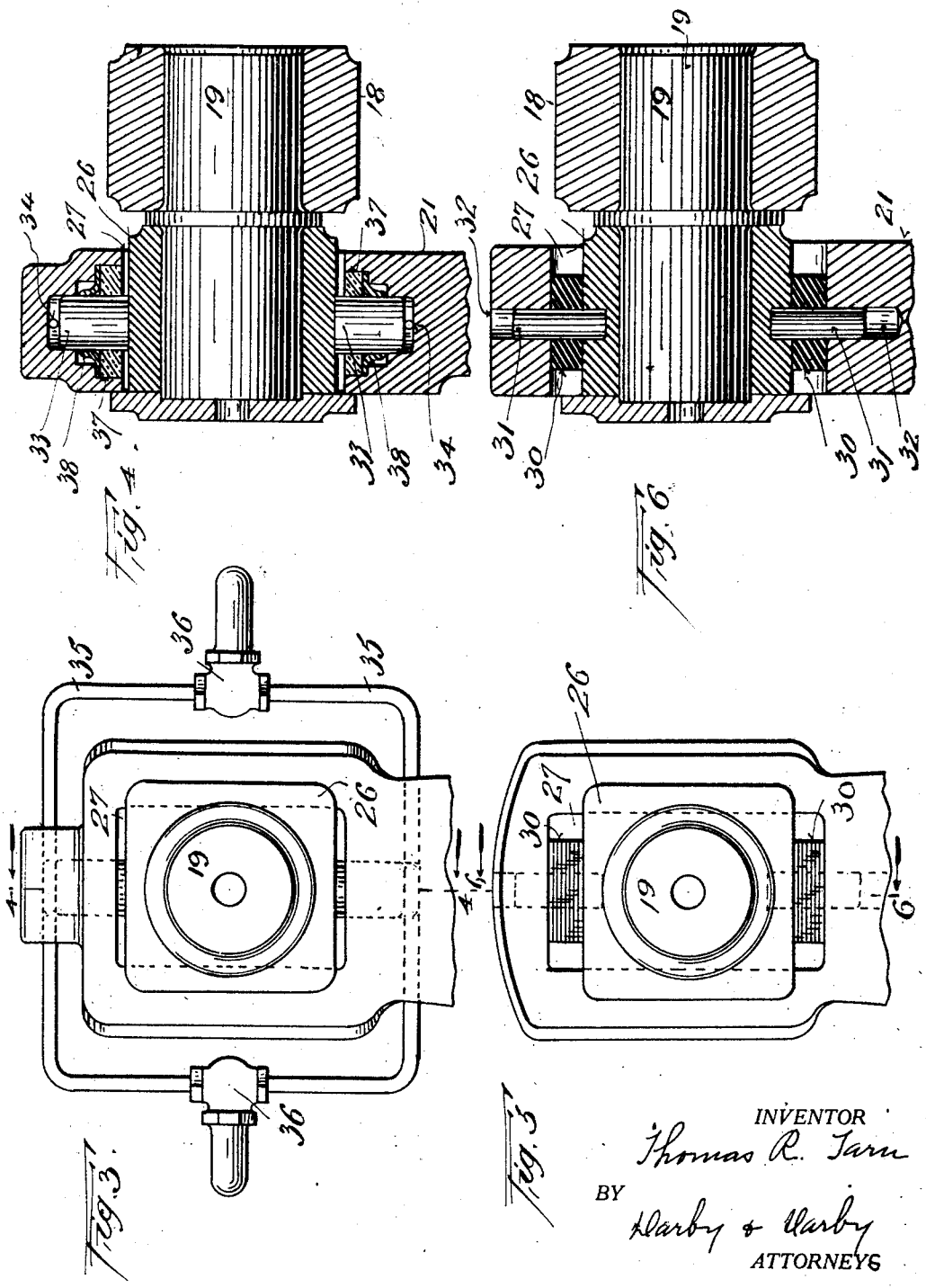
INVENTOR
Thomas R. Tarn
BY
Darby & Darby
ATTORNEYS

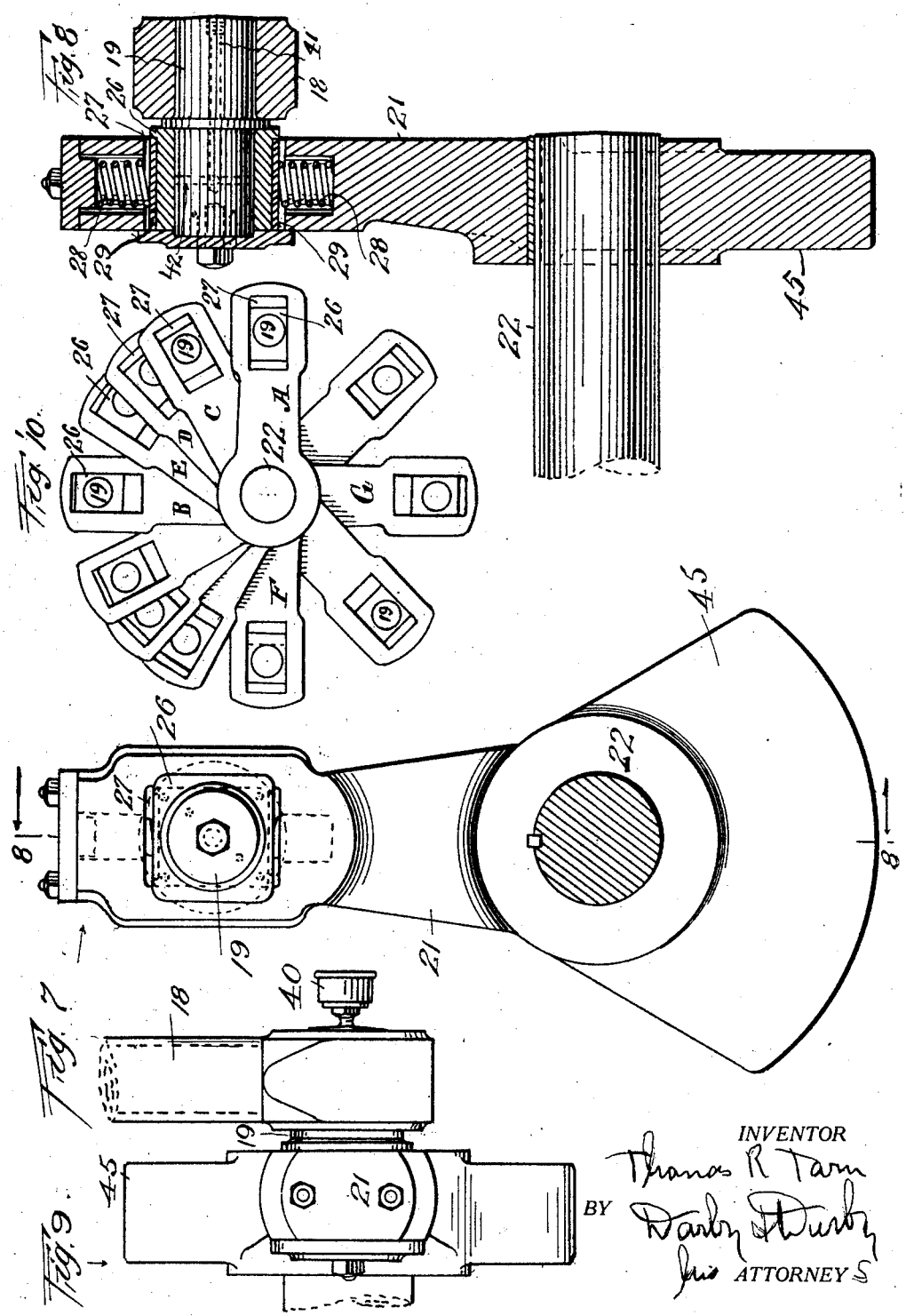

Patented Aug. 27, 1929.

1,726,249

UNITED STATES PATENT OFFICE.

THOMAS R. TARN, OF BROOKLYN, NEW YORK.

COMPENSATING CRANK STRUCTURE FOR PITMAN DRIVES.

Application filed May 31, 1923. Serial No. 642,696.

This invention relates to compensating crank structure for pitman driven mechanism.

The object of the invention is to provide a crank structure for pitman drive mechanism which is simple and efficient, and wherein the pitman automatically adjusts itself relatively to the crank according to the angular position of the crank.
A further object is to provide a crank actuated drive mechanism of the nature referred to and of such structure and arrangement as to permit the use and application of high power engines, as well as engines of the internal combustion type, in various situations where their use has heretofore been prohibited.

A further and more specific object of the invention is to provide a crank actuated pitman drive mechanism of the nature referred to for operating the stern paddle wheels of light draft cargo and other boats, and with the use of high power engines.

Other objects of the invention will appear more fully hereinafter.

The invention consists substantially of the construction, combination, location and relative arrangement of parts, all as will be more fully hereinafter set forth, as shown in the accompanying drawings, and finally pointed out in the appended claims.

Referring to the accompanying drawings:

Figure 1 is a view in plan, somewhat diagrammatic, showing a power driven crank actuated pitman drive mechanism embodying my invention as applied to a paddle wheel located at the stern of a boat.

Fig. 2 is a view in side elevation of the same.
Fig. 3 is a view in elevation of the outer end portion of a crank arm showing one arrangement of compensating or shiftable wrist pin box embodying the principles of my invention.
Fig. 4 is a broken view in section on the line 4, 4, Fig. 3, looking in the direction of the arrows.

Fig. 5 is a view similar to Fig. 3, showing another form of compensating mounting for the wrist pin box in accordance with the principles of my invention.

Fig. 6 is a broken view in section on the line 6, 6, Fig. 5, looking in the direction of the arrows.

Fig. 7 is a view similar to Figs. 3 and 5 showing still another arrangement of compensating mounting for the wrist pin box embodying my invention and showing the counterbalance for the crank arm.

Fig. 8 is a view in section on the line 8, 8, Fig. 7, looking in the direction of the arrows.

Fig. 9 is a top plan view of the structure shown in Figs. 7 and 8.

Fig. 10 is a diagram illustrating the compensating movements of the wrist pin box in various positions of angularity of the crank arm.

The same part is designated by the same reference numeral wherever it occurs throughout the several views.

The use of paddle wheel propulsion for boats of various kinds particularly on rivers and lakes of shallow draft is a necessity, and the advantages of such method of propulsion are well recognized. Such method of propulsion heretofore has generally required a steam power plant which is simple, rugged and of low cost. The use of a steam power plant in the smaller boats, however, is prohibitive, for the reason that the weight of the boilers and engines and their auxiliaries requires a greater navigable depth of water for such boats than is always available. Moreover, the space occupied by such a plant very materially limits the space available for cargo and crew quarters which is a most important factor in shallow, light draft cargo carrying craft in river transportation. Although the modern development of internal combustion engines has placed a newer power plant of greater economy of operation at the disposal of marine engineers, nevertheless the application of such a power plant to river and lake craft, particularly such craft of the shallow draft type with stern paddle wheel propulsion, presents serious difficulties which have not be overcome successfully to any great extent, so far as I am aware. In the first place it is imperative that shallow draft boats be maintained on as even a keel as possible. To secure this result, particularly in the case of stern paddle wheel propulsion, the driving motor must be placed well forward on the boat, which means that it must be removed a considerable distance from the stern paddle wheel. Moreover, to maintain the proper trim of the boat the power shaft of the motor should extend fore-and-aft, and, consequently, the direction of the application of the power of the motor in properly driving the stern paddle wheel shaft must be changed so as to be athwart the boat at some convenient point. Again, the high speeds of motors of the internal combustion type, and the relatively low speeds at which it is practicable to drive the propelling paddle wheel necessitates the use of reduction gearing intermediate the motor and paddle wheel. In addition to the difficulties referred to certain mechanical difficulties are encountered in the attempts to apply high powered internal combustion engines to the propulsion of stern paddle wheels, and in many cases the lower powered motors are insufficient for the purpose, particularly in meeting the requirements for shallow draft cargo boats of large size and capacity towards which the modern demands of river transportation strongly trends. The mechanical difficulties referred to, in the case of the application of the power to the paddle wheel shaft, and to other means to be driven, through the usual cranks and pitmans, which have proven to be the most practical way, for the reason that any misalignment or wear of the parts, the weaving motions to which, in use, the hull structure is subjected, errors in assembly and installing the machinery, or in the adjustment of the bearings, all tend to set up undue stresses and racking which cause the cranks to become loose on the shafts, the bearings to run hot, which means loss of power, and many other troubles.

It has been attempted, in the case of the use of internal combustion and electric motors of the low power class, for boat propulsion, to avoid the serious difficulties above referred to, by using chain or other form of cable or belt connections between the motor driven lay or countershaft and the shaft of the paddle wheel. Such expedient, however, is not practical with large power motors, or large capacity boats, because of the shocks developed by the paddle wheel in operation, and even in the case of the use of low powered motors trouble is caused from this source by reason of the stretching and frequent breakage of the chain or cable drive connections.

I have discovered, however, that by providing a suitably compensated pitman drive connection intermediate the motor or engine, and the device to be driven I am enabled to avoid the use of chain, cable, belt or similar drives, and to employ the more direct acting, satisfactory and sturdy pitman drive, while at the same time I am enabled, thereby to use the less expensive, more compact and economical internal combustion engine.

It is among the special purposes of my invention, therefore, to provide an automatically acting compensating pitman drive connection which is simple and inexpensive in structure, and permits the use of internal combustion engines and other types of motors in situations and for purposes where the use thereof has not been practicable or desirable before.

While I will describe my invention in the application thereof for driving stern paddle wheels for boats, it is to be understood that in this respect I am not to be limited or restricted, as a compensating pitman drive connection embodying the principles of my invention and securing the advantages and benefits set forth herein is equally well adapted for use generally wherever power transmission is desired, and whether from steam or internal combustion engines, or other types of motors, or of high or low power.

In the drawings reference numeral 15 designates the stern end of a boat of the shallow draft type, 16 the stern paddle wheel for propelling the same, 17 the paddle wheel shaft, and 18 pitmen for driving said shaft. The ends of the pitmen 18 are connected by wrist pins 19 in the ends of crank arms 20, 21. The crank arms 20 are mounted at the ends of the paddle wheel shaft 17, while the crank arms 21 are mounted on the ends of a lay or countershaft 22 which is driven by suitable reduction gearing 23, 24, from a motor or engine shaft 25. In practice I prefer to employ two pitmen 18, one disposed at each side of the boat, said pitmen being arranged in parallel relation to each other. I also prefer to arrange the crank arms 20 and 21 at opposite ends of shafts 17 and 22 at right angles to each other, so that as one pitman is in dead center position the other is at the point of exerting its maximum power.

The reduction gearing intermediate the power shaft 25 and the lay or countershaft 22 is preferably in the form of intermeshing worm gears, respectively mounted on said shafts, and the engine or power shaft 25 is disposed in fore-and-aft relation and preferably at the center line of the boat, while the lay shaft 22 extends transversely across the boat.

The automatic compensating feature constituting my present invention is shown in various embodiments thereof, in Figs. 3 to 8, inclusive, wherein the wrist pin 19 is shown as connecting the end of a pitman to the crank arm 21 on shaft 22. It is to be understood, however, that my invention is not to be limited in this respect as the compensation may be effected in the wrist pin connection of the pitman with either or both crank arms 20, 21. The wrist pin is rigidly connected in one of the members 20, 21 or 18 and is rotatively received in a box 26 in the other of said members. In the particular arrangement shown the box 26 is mounted in the crank arm instead of the pitman, but this is an immaterial detail as it may as well be mounted in either. The wrist pin box 26 is received in a slot 27 or opening in the member in which it is mounted and is held therein against rotation but is free to move radially through a limited extent. If desired, the free radial movement of the wrist pin block 26 in the elongated opening 27 may be yieldingly resisted. This can be accomplished in various ways. In Figs. 7 and 8 I have shown a coil spring 28, disposed at opposite sides of the wrist pin box 26 and arranged in housings within the member carrying the wrist pin box, shown in this instance as the crank arm 21. The springs 28 cushion the radial movements of the wrist pin box and prevent impact of the wrist pin box with the walls of the slot 27 within which it works. If desired, a steel or other form of plate 29 may be interposed between the wrist pin box and the adjacent end wall of the slot 27, said plates receiving the contact of the cushion springs 28.

In Figs. 5 and 6 I have shown a slightly modified arrangement of cushion consisting of the interposition of rubber or resilient blocks 30 between the end walls of the slot 27 and the wrist pin box 26. If desired, these rubber or resilient blocks 30 may be maintained under compression when the box 26 is in centered relation with respect to the length of the slot 27. In this form of arrangement the blocks 30 may be held against displacement in any suitable or convenient manner. A simple arrangement is shown consisting of pins 31 carried by the box 26 and extending through the cushion blocks 30 and working in holes or openings 32 in the member carrying the box 26.

In Figs. 3 and 4 I have shown a hydraulic cushioning arrangement consisting of plungers 33 working in small cylinders having port openings 34. These port openings communicate with pipes 35 having suitable valves 36 therein. The plungers 33 work through washers 37 and, if desired, may be packed by the leather or other flexible cups 38. In this arrangement any force tending to move the wrist pin box 26 towards one end of the slot 27 will cause the plunger 33 toward which the box 26 moves, to shift or move in its cylinder, thereby forcing a fluid content in the pipe system 35 through the port 34 of said cylinder in which the other plunger works. The resistance to the shifting of the fluid medium which secures the desired cushioning effect, is secured through the adjustment of the valves 36.

As above described, the wrist pin 19 may be rigidly held in either of the members 18, 20 or 21 while the shiftable wrist pin box in which the wrist pin is journaled to rotate may be mounted in a slot 27 in the other of said members.

If desired, a desirable lubrication of bearing in which the wrist pin rotates may be effected in any convenient manner. I have shown, in Figs. 8 and 9, an arrangement for accomplishing this purpose wherein an oil cup 40 is secured in the end of a longitudinal slot 41 formed in the wrist pin and which communicates with ducts 42 which extend to the bearing surface of box 26 with which the wrist pin contacts.

In the diagrammatic view in Fig. 10 is illustrated the theoretical operation of the compensating feature. When the crank arm is in dead center relation with respect to the position of the pitman as, for example, in the position of the lower pitman as shown in Fig. 2 where the pitman 18 is in longitudinal alignment with the crank arms 20, 21, said crank arms being in a horizontal position. When in this relation, indicated at A in Fig. 10, the wrist pin box 26 occupies a medial position within its slot 27. In this position the pitman has reached the point where it is performing its minimum of driving work. As the cranks 20, 21, rotate in the direction indicated by the arrow in Fig. 2 to drive the paddle wheel in the required direction, said cranks gradually shift from their horizontal into their vertical position, as indicated at B, Fig. 10, at which point the pitman attains its maximum working power. In the intermediate positions, indicated at C, D and E, in Fig. 10, it will be observed that the working effort of the pitman is constantly increasing. This means that a force is applied tending to shift the wrist pin box 26 in the slot 27 towards the outer end of said slot and hence, the axis of the wrist pin 19 moves radially and laterally with the box 26, thereby departing more and more from the circle containing said axis when in position A, the circle being struck from the center of the shaft 22. This means that a relative radial movement takes place between the pitman and the crank arm, such relative movement being accomplished in the wrist pin connection between these members, such movement being radially and outwardly from the position indicated at A in Fig. 10, to the position indicated at B in said figure. This relative or flexible movement in the connections between the crank arm and pitman permits the pitman to accommodate itself to the varying positions of angularity of the crank arm and relieves the entire structure of stresses and strains to which it would be subjected if said connection were a rigid, non-flexible or immovable connection. From position B to position F the opposite operation takes place. That is, from position A to position B the crank arm exerts a pulling action upon the pitman, in the direction of its length and this is what causes the tendency in the wrist pin box to move towards the outer end of the slot 27, and the tendency of the box to move radially outwardly increases until the position B is attained. From position B to position F, while there is still a pulling effort exerted by the crank on the pitman, that pull is of decreasing amount and is applied to a different angle due to the change in the direction and angularity of the crank, and therefore the tendency of the wrist pin box is to move in the reverse direction or radially inwardly in the slot 27 so that in position F the box again occupies its medial position in said slot. From position F to position G the crank is exerting an increasing pushing effort upon the pitman and hence the tendency is again for the box to move radially outwardly in its slot 27, and this tendency increases until the position G is reached. From this position to position A there continues to be a pushing effort exerted by the crank upon the pitman, but of decreasing force, and likewise through angular relation and direction of movement of the crank so that when the position A is again reached the box again occupies its medial position in the slot. It is due to these compensating movements of the pitman connection to the crank that I am enabled to overcome the various objections noted,—of undue stresses and racking resulting from errors in assembling and in installing or in the adjustment of bearings and hence am enabled to employ a double pitman drive connection with internal combustion motors of high power or of low power where relatively great difference in speed is developed between the motor and the part to be driven, as for instance, the paddle wheel of a boat.

By employing a pitman for each side of the boat and connected to the respective ends of the shaft to be driven but at right angular relation with respect to each other, I am enabled to secure the advantage of a drive in which a driving force is exerted at all times, one of said pitmen exerting its maximum driving power when the other is in its dead center relation.

If desired, the crank arms in connection with which the compensating connection is employed, may be counterbalanced by counterbalancing weight 45.

Having now set forth the objects and nature of my invention and various structures embodying the principles thereof, what I claim as new and useful and of my own invention and desire to secure by Letters Patent is:

1. In a compensating crank and pitman drive mechanism, the combination with a pitman and a driving crank therefor, of a wrist pin connecting said parts, and piston and cylinder means mounted in a wrist pin housing located at one end of said pitman to permit yielding lateral movement between said wrist pin and one of said parts.

2. In a compensating crank and pitman drive mechanism, the combination with a pitman and a driving crank therefor, one of said parts having an elongated slot, a wrist pin box mounted to slide in said slot, a wrist pin connected to the other of said parts and journaled in said wrist pin box, and fluid pressure means to yieldingly resist the sliding movements of said box.

3. The combination with a crank and a pitman, one of these parts having an elongated slot extending longitudinally thereof, of a wrist pin connected to the other of said parts and engaging in said slot, of a journal box mounted to slide in said slot, a wrist pin connected to the other of said parts and journaled in said box, and fluid pressure means disposed at opposite sides of said box to yieldingly resist the sliding movements thereof.

4. The combination of a driving shaft, a shaft to be driven, crank arms at each end of each shaft, and a pitman for each pair of crank arms, the cranks on each shaft being in right angular relation to each other, a fluid pressure compensating connection between at least one of said pitmen and one of its cranks, and means to actuate said driving shaft.

5. The combination with a crank and a pitman having an elongated slot therein, of a wrist pin therein, and a housing for said pin having a plurality of pistons and cylinders therein, whereby the connection between said crank and pitman is yieldingly resisted due to the coaction of said pistons with a fluid cushioning means disposed in said cylinders, together with adjustable fluid connections between said cylinders.

6. The combination with a crank and a pitman having an elongated slot therein, and a plurality of cylinders thereon, of a wrist pin therein, a housing for said pin mounted in said slot and a plurality of pistons on said housing and in said cylinders.

7. The combination with a crank and a pitman having an elongated slot therein, and a plurality of cylinders thereon, of a wrist pin therein, a housing for said pin mounted in said slot, a plurality of pistons on said housing and in said cylinders, and adjustable fluid connections between the cylinders.

8. In a compensating crank and pitmen drive mechanism, the combination with a pitman and a driving crank therefor, of a wrist pin connecting said parts, a housing for said pin mounted in said pitman and pneumatic means mounted in said housing to permit lateral movement betwen one of said parts and said wrist pin.

9. The combination with a crank and a pitman, one of these parts having an elongated slot extending longitudinally thereof, of a wrist pin connected to the other of said parts and engaging in said slot, and fluid pressure means aranged on opposite sides of said pin to yieldingly resist the lateral movement thereof in said slot.

In testimony whereof I have hereunto set my hand on this 21st day of May A. D., 1923.

THOMAS R. TARN.